No. 854,423. PATENTED MAY 21, 1907.
C. J. JOHNSON.
TRACTION GANG PLOW.
APPLICATION FILED JUNE 11, 1906.

3 SHEETS—SHEET 1.

Witnesses
A. H. Opsahl.
E. W. Jeppesen.

Inventor
C. J. Johnson
By his Attorneys
Williamson & Merchant

No. 854,423. PATENTED MAY 21, 1907.
C. J. JOHNSON.
TRACTION GANG PLOW.
APPLICATION FILED JUNE 11, 1906.

3 SHEETS—SHEET 2.

Witnesses.
A. H. Opsahl.
E. W. Jeppesen.

Inventor.
C. J. Johnson
By his Attorney.
Williamson & Merchant

No. 854,423. PATENTED MAY 21, 1907.
C. J. JOHNSON.
TRACTION GANG PLOW.
APPLICATION FILED JUNE 11, 1906.

3 SHEETS—SHEET 3.

Witnesses.
A. H. Opsahl.
E. W. Jeppesen

Inventor.
C. J. Johnson.
By his Attorneys.
Williamson & Merchant

UNITED STATES PATENT OFFICE.

CHARLES J. JOHNSON, OF LANHAM, TEXAS, ASSIGNOR OF ONE-HALF TO JAMES J. LUMPKIN, OF MERIDIAN, TEXAS.

TRACTION GANG-PLOW.

No. 854,423.　　　Specification of Letters Patent.　　　Patented May 21, 1907.

Application filed June 11, 1906. Serial No. 321,100.

*To all whom it may concern:*

Be it known that I, CHARLES J. JOHNSON, a citizen of the United States, residing at Lanham, in the county of Hamilton and State of Texas, have invented certain new and useful Improvements in Traction Gang-Plows; and I do hereby declare the following to be a full, clear, and exact description of the invention, such as will enable others skilled in the art to which it appertains to make and use the same.

My invention relates to traction gang plows employing disks as furrow opening devices, and has for its object to improve the construction thereof in the several particulars hereinafter noted.

The invention consists of the novel devices and combinations of devices hereinafter described and defined in the claims.

In the accompanying drawings which illustrate the improved machine, like characters indicate like parts throughout the several views.

Figure 1:
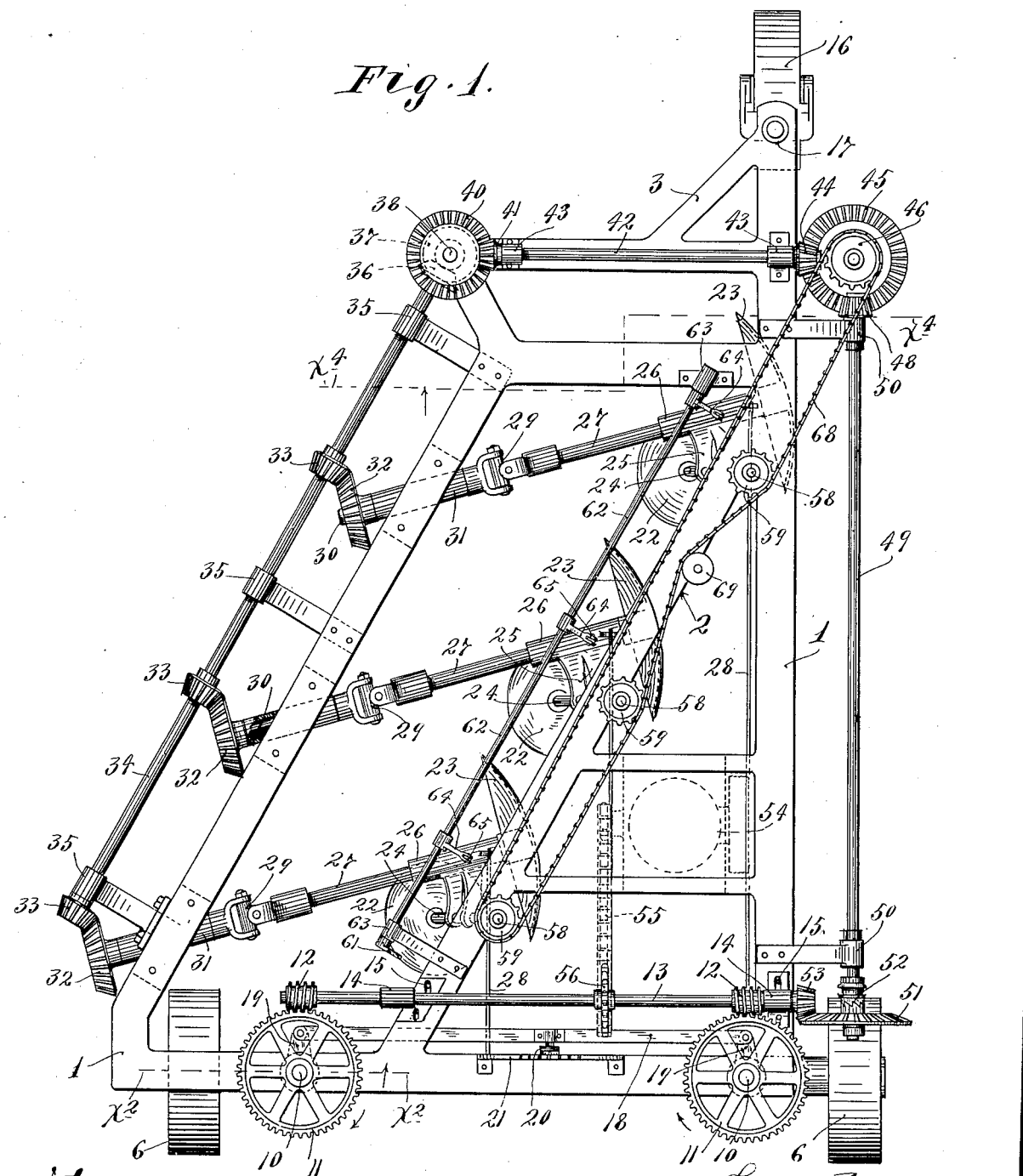
Figure 2:
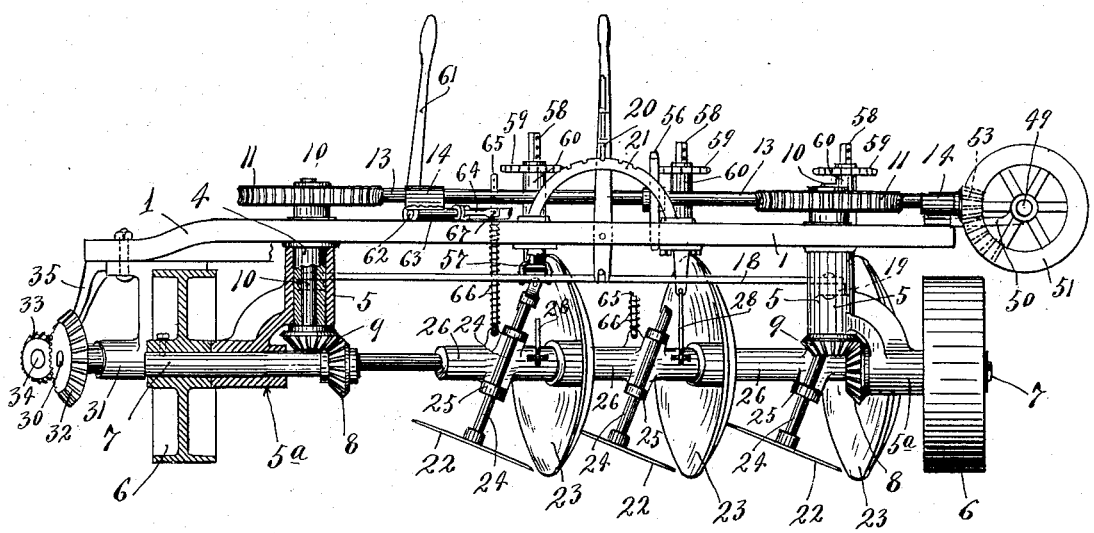
Figure 5:
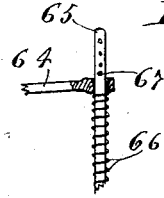
Figure 3:
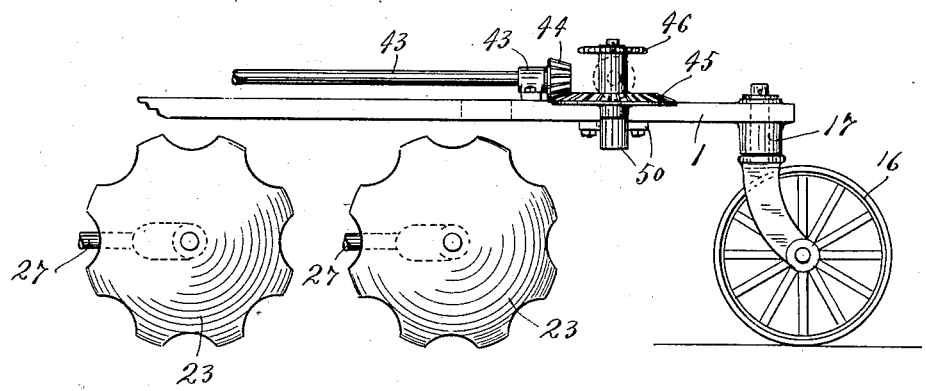
Figure 4:
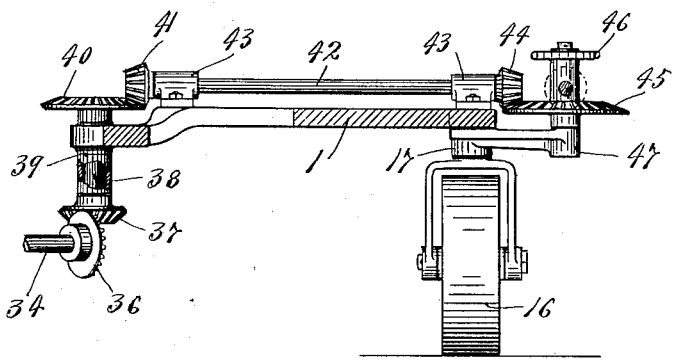

Referring to these drawings, Figure 1 is a plan view of the improved machine. Fig. 2 is a front elevation of the same, some parts being sectioned on the line $x^2 x^2$ of Fig. 1. Fig. 3 is a fragmentary view in side elevation, with parts broken away, showing the rear portion of the machine. Fig. 4 is a transverse vertical section taken on the irregular line $x^4 x^4$ of Fig. 1; and Fig. 5 is a detail view showing part of one of the lifting connections for one of the furrow forming devices.

The numeral 1 indicates the main frame of the plow, the said frame having, in plan view, approximately the form of a right angle triangle, the same having, however, an intermediate obliquely set bar 2 and a rearwardly projecting bearing portion 3. That portion of the frame which would correspond to the base of the triangle is arranged for movement in front, and rigidly secured to this transversely extended front portion is a pair of laterally spaced depending bearing sleeves 4. Loosely swiveled or journaled on the bearing sleeves 4 are bearing sleeves 5 that are formed integrally with outwardly extended horizontal bearing sleeves $5^a$.

The plow frame is supported on and carried by three wheels, two of the wheels being located in front and operating as traction wheels, and the third wheel being a caster wheel which is located at the rear of the machine. The two traction wheels 6 are secured to axles 7 that are loosely swiveled in the horizontal bearing sleeves $5^a$ and are provided, at their inner ends, with bevel gears 8. The bevel gears 8 mesh with bevel gears 9 secured to the lower ends of vertical counter shafts 10 that extend through and are journaled in the rigid or non-rotary bearing sleeves 4. To the upper ends of the counter shafts 10 are secured worm gears 11 that mesh with worms or screws 12 carried by a transverse shaft 13, which shaft is mounted in bearings 14 that are adjustably secured to the frame 1, as shown, by slot and bolt engagements 15.

The caster wheel 16, at the rear of the machine, is swiveled in a bearing 17 rigidly secured to the frame extension 3, and this wheel follows the line of travel which is determined by angular adjustments of the traction wheels 6 and wheel supporting bearings 5—$5^a$, around the vertical axes of the fixed bearing sleeves 4. Parallel angular adjustments of the two wheels is insured by a connecting bar 18 which is pivotally connected to rearwardly projecting arms 19 that are rigid on the vertical sleeves 5 of the respective oscillatory wheel bearings. Movements of the connecting bar 18 and, hence, steering movements of the traction wheels, are accomplished by a latch lever 20 which is pivoted to the front portion of the frame 1, and coöperates with the notched latch arch which is rigidly secured to said frame.

The plow herein illustrated is adapted to simultaneously cut and turn several furrows, and each furrow forming device comprises two disks, one of which runs ahead of the other and is adapted to cut the bottom of the furrow, while the other follows closely after it and completes and turns the furrow. The first noted disk 22 is flat, while the second, marked 23, is concavo convex. The said disk 22 is rigidly secured to the lower end of a shaft 24 that is set at an angle of about twenty degrees to a perpendicular, and is journaled in bearing prongs 25 of a bearing sleeve 26. The disk 23 is rigidly secured on one end of a shaft 27 that is loosely journaled in the sleeve 26.

The sleeves 26 of the several furrow forming devices are loosely and independently connected to the front portion of the frame 1 by drag bars 28. The shafts 27 of the several furrow forming devices are connected by knuckle joints 29 to short shafts 30 that are journaled in bearings 31 rigidly secured to the outer obliquely extended portion of the frame 1. The several shafts 30, at their outer ends, are provided with bevel gears 32 that mesh with bevel pinions 33 of an obliquely set counter-shaft 34, which counter-shaft is journaled in suitable bearings 35 rigidly secured to the frame 1. At its rear end the shaft 34 is provided with a bevel gear 36 that meshes with a bevel gear 37 of a short vertical shaft 38 loosely journaled in a bearing 39 on the frame 1. The shaft 38, at its upper end, carries a bevel gear 40 that meshes with a pinion 41 of a short transverse shaft 42, which shaft is journaled in bearings 43 on the rear portion of the frame 1. At its other, the shaft 42 is provided with a bevel pinion 44 that meshes with a bevel gear 45, which gear is, as shown, formed integrally with a sprocket 46, the two being loosely journaled on a bearing arm 47 rigidly secured to the frame 1. The bevel gear 45 also meshes with a bevel pinion 48 carried by the rear end of a shaft 49, which shaft is journaled in bearing arms 50 secured to the adjacent side of the frame 1. On the forward end of the shaft 49 a bevel gear 51 is loosely mounted, but is adapted to couple to the said shaft or to uncouple therefrom, at will, by a suitable clutch 52, shown in Fig. 1. The bevel gear 51 meshes with a bevel pinion 53 which is secured to the adjacent end of the heretofore described counter-shaft 13.

Power for driving the traction wheels of the machine so as to cause the same to advance over the ground, and also for rotating the several disks, will usually be an explosive engine mounted on the frame of the engine. Such an engine is indicated by dotted lines in Fig. 1 and is designated by the numeral 54. In the same view, the dotted lines marked 55 indicate a sprocket chain which is driven from the engine 54 and runs over a sprocket 56 on the said counter-shaft 13.

The upper ends of the disk shafts 24 are connected by knuckle joints 57 to vertically extended angular shafts 58 that are mounted to slide through but to rotate with sprockets 59, the sleeve-like hub portions 60 of which is journaled on or swiveled to the bar 2 of the frame 1. The upper ends of the said angular shafts 58 are perforated so that by means of pins inserted therein, the extreme downward movements of the disks 22 may be limited for the desired depth of furrow.

The several furrow cutting devices may simultaneously raised and lowered by means of a lever 61 secured to a rock shaft 62 mounted in bearings 63 on the frame 1, and provided with arms 64, which arms are connected one to each of the bearing sleeves 26, by means of lifting links made up of connecting rods 65 and springs 66. Said rod 65, (see Fig. 5), works freely through a perforation in the free end of the coöperating arm 64, and the coiled spring 66 surrounds said rod and is compressed between said arm and the coöperating bearing sleeve 26. Pins 67 in the upper ends of the rods act as stops against the arms 64 so that said links are adapted to positively raise the said furrow opening disks. The springs 66 coöperate with gravity and yieldingly hold the disks to their work when lowered, and permit the disks of the different furrow opening devices to raise and lower independently when running over rocks or other obstacles in furrows which are being formed.

A long sprocket chain 68 runs over the sprocket 46 and over the sprockets 59, and also over a guide wheel 69 mounted on the frame bar 2.

By the connections above described, when the clutch 52 is in action and motion is imparted to the counter-shaft 13 from the engine 54, the traction wheels 6 and all of the disks 22 and 23 will be positively driven so that machine may be caused to travel over the ground, and the disks will be caused to rotate and, hence, more readily cut the furrow under the advanced movement of the machine. When the clutch 52 is thrown out of action and the engine is thrown into action, the traction wheels will be driven and the machine will be caused to travel, but the disks will not then be rotated and, at this time, should be raised into inoperative positions by means of the lever 61 and connections described. The driving connections described, as is evident, will transmit motion to the traction wheels and, at the same time, permit them to be given angular movements by means of the steering connections described.

As best shown in Fig. 3, the peripheries of the furrow turning disks 23 are notched or serrated, so that they will more readily cut through tough sod or hard ground.

What I claim is:

1. In a traction gang plow, the combination with traction wheels, of a plurality of furrow opening devices, each comprising a pair of disks, an engine carried by said plow, and driving connections from said engine to said traction wheels and to said disks, the driving connections to said disks including flexible shafts, whereby the said disks may be raised and lowered, substantially as described.

2. In a traction gang plow, the combination with traction wheels mounted for angular movements to steer the machine, a caster wheel supporting the rear portion of the machine frame, a lever actuated connection for imparting parallel steering movements to the said traction wheels, a plurality of furrow opening devices, each comprising a pair of disks, an engine carried by the plow, driving connections between said engine and the said traction wheels arranged to drive said traction wheels while permitting angular steering movements thereof, and driving connections from said engine to said disks, including flexible shafts for raising and lowering said disks, and a clutch whereby said disks may be thrown into and out of action while the machine is under motion, substantially as described.

In testimony whereof I affix my signature in presence of two witnesses.

CHARLES J. JOHNSON.

Witnesses:
 FRED CHRESTOFFERSON,
 FRIEDRICH GIEZE.